(12) United States Patent
Lanzingh

(10) Patent No.: US 9,731,225 B2
(45) Date of Patent: Aug. 15, 2017

(54) DEAERATOR AND METHOD FOR DEAERATION

(71) Applicant: Tetra Laval Holdings & Finance S.A., Pully (CH)

(72) Inventor: Christer Lanzingh, Lund (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 510 days.

(21) Appl. No.: 14/367,882

(22) PCT Filed: Dec. 14, 2012

(86) PCT No.: PCT/EP2012/075567
§ 371 (c)(1),
(2) Date: Jun. 20, 2014

(87) PCT Pub. No.: WO2013/092420
PCT Pub. Date: Jun. 27, 2013

(65) Prior Publication Data
US 2015/0122126 A1    May 7, 2015

(30) Foreign Application Priority Data

Dec. 21, 2011 (SE) .................................. 1151243

(51) Int. Cl.
*B01D 19/00* (2006.01)
*A23L 2/76* (2006.01)

(52) U.S. Cl.
CPC ............ *B01D 19/0036* (2013.01); *A23L 2/76* (2013.01); *B01D 19/0005* (2013.01); *B01D 19/0063* (2013.01)

(58) Field of Classification Search
CPC .................. A23L 2/76; B01D 19/00–19/0495
See application file for complete search history.

(56) References Cited

U.S. PATENT DOCUMENTS

| 5,180,403 | A | 1/1993 | Kogure |
| 6,981,997 | B2 | 1/2006 | Williams et al. |
| 2009/0249955 | A1 | 10/2009 | Bodner |

FOREIGN PATENT DOCUMENTS

| DE | 2740886 | 4/1979 |
| DE | 10 2007 049475 A1 | 4/2009 |
| GB | 1577214 | 10/1980 |

(Continued)

OTHER PUBLICATIONS

International Search Report in PCT/EP2012/075567, mailed Apr. 5, 2013 (2 pages).

*Primary Examiner* — T. Bennett McKenzie
(74) *Attorney, Agent, or Firm* — Finnegan, Henderson, Farabow, Garrett & Dunner, L.L.P.

(57) ABSTRACT

A system for deaeration of a liquid comprises a heater for heating the liquid to a well-defined temperature, means for pressurizing the liquid, a first piping for guiding the heated liquid to a separation vessel, a vacuum pump for evacuating deaerated gases from the separation vessel, and a second piping for guiding the deaerated liquid from the separation vessel. The system further comprises an inert-gas supply and a mixer for supplying and mixing in inert gas into the liquid in the first piping. The vacuum pump is controllable to maintain a separation pressure in the separation vessel corresponding to a pressure at or slightly above the saturation pressure.

6 Claims, 1 Drawing Sheet

(56) References Cited

FOREIGN PATENT DOCUMENTS

| | | | | |
|---|---|---|---|---|
| GB | 1577214 A | * | 10/1980 | ......... B01D 19/0005 |
| RU | 2106313 C1 | | 3/1998 | |
| RU | 2217383 C1 | | 11/2003 | |

* cited by examiner

DEAERATOR AND METHOD FOR DEAERATION

CROSS-REFERENCE TO RELATED APPLICATIONS

This is a U.S. National Phase of PCT/EP2012/075567, filed Dec. 14, 2012, which claims the benefit of priority to Swedish Patent Application No. 1151243-1, filed Dec. 21, 2011, which is incorporated herein by reference.

TECHNICAL FIELD

The present invention relates to a device and a method for deaeration of a liquid, predominantly a liquid food product or other consumer product.

BACKGROUND

Within the field of packaging of liquid products deaeration is a well established concept and deaeration is included as an essential step in most processing plants e.g. in plants where liquid product is received as a bulk in a first end of the line and delivered as individual packaging containers in the other end of the line. In the bulk product the amount of dissolved oxygen corresponds to the saturation concentration at that particular pressure and temperature. The total amount of oxygen may very well exceed this amount on due to previous processing of the product. For some product this amount of oxygen is acceptable, yet for others, and in particular fruit juices or products with an extended shelf-life the amount of dissolved oxygen has to be reduced further in order not to affect the product negatively.

To simplify the underlying theory, which obviously is well-established and well-known to the skilled person, the solubility of a gas such as oxygen or nitrogen in a liquid will depend of temperature and pressure. At lower temperatures more oxygen or nitrogen may be dissolved in the liquid than what is the case at a higher temperature, i.e. the saturation concentration is higher at a lower temperature. For pressure the relationship is reversed, the higher the pressure the higher the saturation concentration. This simple relationship establishes that in order to deaerate a liquid one or both of the temperature or the pressure may be altered. Also, it may be obvious that deaeration as such is not difficult to accomplish by simply dialing in the desired temperature and pressure of a particular saturation concentration in a vessel containing the liquid. In a commercial filling machine, however, the deaeration should allow treatment of thousands of liters of liquid product per hour with a requirement of being energy efficient which renders the theoretical approach of awaiting equilibrium to be reached inapplicable.

An established method for deaeration of a liquid is by a process called stripping. By mixing an inert gas, such as carbon dioxide or nitrogen into the liquid to be deaerated the equilibrium will be affected and other dissolved gases will diffuse into the gas phase inert gas. Bubbles will form and the mix will leave the liquid and may thereafter be vented off. This process is commonly performed in stripping columns, yet in U.S. Pat. No. 6,981,997 an inline solution is presented. In the disclosed embodiments carbon dioxide is injected and mixed into a pressurized and chilled stream of liquid to be deaerated. Following the injection of the inert gas the stream is guided by a pipe to a pressure reduction valve leading into another pipe, which pipe debouches into a vessel. In the vessel the carbon dioxide is vented off together with other gases which has diffused into the gas phase carbon dioxide, and the deaerated liquid is guided away from a bottom portion of the vessel by means of a third pipe.

A deaeration method more commonly used in the main field of the present invention is to make use of a vacuum deaeration in an expansion vessel connected to vacuum. A particular vacuum level corresponds to a particular boiling point of the liquid. The liquid is transported to the expansion vessel with a certain temperature which is some degrees above the boiling point which has been adjusted by way of the vacuum value. When the liquid enters the vessel the temperature falls immediately as the liquid boils or flashes and air (as well as other gases in the liquid) is expelled. The liquid vapors condense against cooled areas in the upper portion of the vessel, while the air which has boiled off is sucked away from the vessel by the vacuum pump. The deaerated liquid exits through an opening in the bottom of the vessel. In order to increase the separation rate the liquid may enter the expansion vessel in a tangential direction, so as to induce a swirl.

The above methods provide excellent deaeration of the liquid. Yet improvements resulting in improved energy efficiency and improved space efficiency are always contemplated. The present invention relates to such improvements.

SUMMARY

The present invention relates to a system for deaeration of a liquid. The system comprises means for heating the liquid to a well-defined temperature, means for pressurizing the liquid, a first piping for guiding the heated liquid to a separation vessel, a vacuum pump for evacuating deaerated gases from the separation vessel, a second piping for guiding the deaerated liquid from the separation vessel. Compared to traditional vacuum-based, flashing, systems the present invention is characterized in that it comprises a mixer for mixing in inert gas into the liquid in the first piping and that the vacuum pump is arranged to maintain a separation pressure in the separation vessel corresponding to a pressure slightly above, yet as close as possible to the vapor pressure for the liquid at that particular well-defined temperature. The vapor pressure is sometimes referred to as the "flash pressure", and in any case the intended meaning in this context is the pressure at which the liquid would start to boil at the well-defined temperature. Starting with other prior art may motivate rearrangement of the preamble and characteristic portion.

The skilled person is well aware of that the flash pressure, i.e. the pressure at which a liquid will start boiling for a specific temperature, will vary with the temperature of the liquid. In that sense to term flash pressure is a relative term. For each temperature, however, it is absolute and predictable. Examples will be given in the detailed description of embodiments.

Further, "slightly" is not an absolute term, yet "slightly above" is intended to denote a pressure very close to the flash pressure, and it is the concept of using a pressure close to the flash pressure, as oppose to a pressure at, below or far from it, which are the alternatives of prior art, that validates this relative language. In absolute terms the separation pressure should be above the flash pressure, but not exceeding it by more than 0.1 bar, preferably not by more than 0.05 bar, and even more preferably it should be as close to the flash pressure as possible without inducing flash. From a control viewpoint and for the skilled person it will be clearly manifested if the pressure in the separation vessel is too low, since it will result in flash boiling and a temperature reduction.

The avoidance of flash (i.e. boiling) results in several advantages. One is that the condenser otherwise required in the separation vessel will be cancelled out. This saves both space and energy. During the process of flash, energy is taken from the liquid, which results in a temperature drop. The temperature drop has to be compensated for, and avoidance of flash therefore saves energy in this aspect too. Still, inducing flash is a very efficient way of deaerating a liquid to the necessary extent, in particular for the capacities e.g. in terms of liters per minute, which are relevant in the present context. The boiling also causes a significant release of gases, which gases have to be taken care of. In some instances this sudden and intense release of gases also may induce loss of aroma, if aromatic products such as fruit juices are processed.

In the present invention the addition of an inert gas in the pressurized liquid upstream the separation vessel results in adequate deaeration down to sub-ppm oxygen levels even without flash, provided that the pressure in the separation vessel in maintained close to the flash pressure.

According to a second aspect the present invention relates to a method for deaeration of a liquid comprising the steps of:

Guiding the liquid through piping to and from a separation vessel,

Heating the liquid upstream the separation vessel,

Pressurizing the liquid upstream the separation vessel,

Mixing an inert gas into the pressurized liquid,

Guiding the liquid into a separation vessel,

Controlling the pressure in the separation vessel to a pressure slightly above the flash pressure, Evacuating the released gases from the separation vessel, Pumping the deaerated liquid from the separation vessel for further processing.

Further details and embodiments will be disclosed in the detailed description.

In one or more preferred embodiments the pressure in the separation vessel, the separation pressure, is maintained within 0.1 bar or even more preferable within 0.05 bar above the flash pressure.

DESCRIPTION OF EMBODIMENTS

Figure 1:
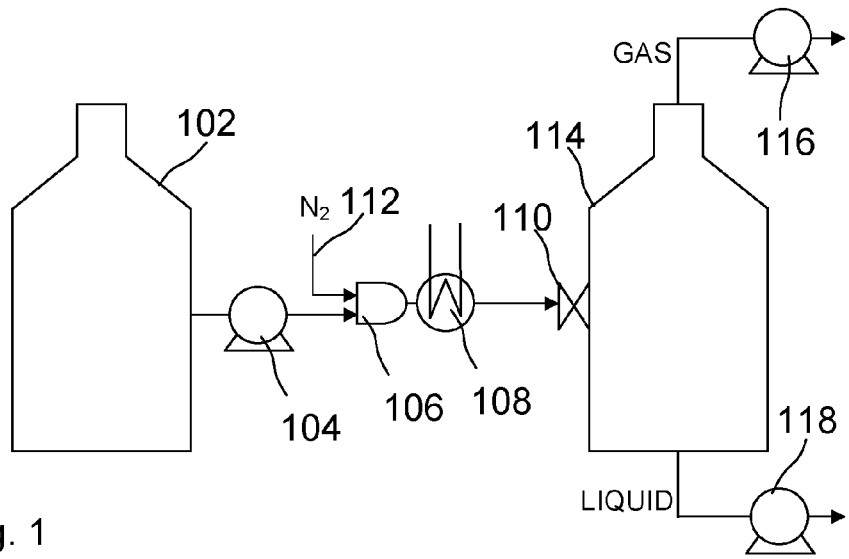
FIG. 1 is a schematic view of a deaerator system according to a first embodiment of the present invention.

Some portions of a system for processing a liquid will be described referring to FIG. 1. The present invention may form part of such a system 100, though individual components may be replaced without departing from the scope of the invention as defined by the claims.

Starting at an upstream position, the system 100 comprises a tank 102 or other system for holding or delivering the liquid to be processed. The system also comprises a pump 104 for increasing the pressure in the liquid, subjecting it to an elevated pressure. In the drawing this is shown as an in-line pump 104, yet the skilled person realizes that pressurization may be accomplished in numerous ways.

Often, a centrifugal pump is used, yet in instances where the product may be harmed by the mechanical action of a centrifugal pump a pump which has a gentler interaction with the liquid may be used. An example could be a pulp-rich fruit juice, in which case a lobe pump may be used. The pressure in the liquid is thus increased to a few bar, typically less than 5 bar, and one example the pressure in the liquid was 3.7 bar and the pressure in the nitrogen was slightly higher. Following that nitrogen is added to the liquid, illustrated at 112 in FIG. 1. In order to distribute the nitrogen in an efficient manner a static mixer 106 is used. Static mixers as such are well known to the skilled person, and their very basic operation principle is that that an injected fluid stream is repeatedly divided, folded, partly or fully reunited and divided again, and static mixers may offer an efficient mixing of a fluid stream at relatively low pressure losses. Again, there are many types of static mixers, and in the present embodiment a commercially available mixer 106 ordinarily used to mix carbon dioxide into beverage was used. The particular type was selected since it was a static mixer having good mixing efficiency and low pressure losses. Other examples may include mixers based on a venturi principle, or mixers utilizing various nozzle arrangements. The amount of nitrogen will obviously vary with the mass flow through the system 100, yet a few examples are given by the end of this description. Starting from those examples it should be within the skills of the artisan to find suitable parameters for a particular situation.

Heating of the liquid may be performed before or after addition of nitrogen, and it is commonly performed by use of a heat exchanger 108. The liquid is preheated to about 50-70° C., and in validation tests performed it was heated to 55° C., 60° C. and 65° C. respectively.

The choice of the type of heat exchanger is not important for the function of the present invention as such, yet in terms of material and for applications within processing of foodstuff there are regulations to follow. These regulations are considered well-known to for the skilled person and may apply to any component of the inventive system, at least those being in contact with the product. A thermocouple or other temperature sensor is arranged in the output flow from the heat exchanger so as to provide a delicate control of the temperature of the liquid, which will then be the "well-defined temperature".

Following heating and mixing the stream of liquid and dissolved gas is lead to a separation vessel 114, which it enters via a decompression valve 110. The pressure inside the separation vessel 114 is controlled by a vacuum pump 116, and for each temperature it was set to be maintained just above the vapor pressure or flash pressure (the pressure at which the liquid would start boiling at that particular temperature). A detailed control of the temperature provides the possibility to use a relatively simple vacuum valve for controlling the pressure inside the separation vessel 114. The control of the vacuum inside the separation valve may also be controlled in a more active manner, with a feedback loop involving control of the vacuum pump as well as control of the decompression valve 110 if considered necessary. The fact that the liquid does not boil in the vessel enables use of a separation significantly smaller than what is the case if flash, or boiling, occurs in the vessel. Further, since there is no vaporization of liquid, there is no need for a condenser which further reduces the size of the vessel, as well as the associated power consumption.

The vacuum pump 116 evacuates gas from the top of the separation vessel 114, while the deaerated liquid is pumped out from the bottom of the vessel by use of a pump 113, for further processing, e.g. pasteurization, homogenization etc. The vacuum pump 116 itself does not have to pull a very high vacuum, and it does not have to handle particularly large amounts of gases.

A number of experiments were conducted for validation purposes of which two are disclosed below as example 1 and example 2.

Example 1

Water at a flow of 4000 l/h was deaerated. Nitrogen was injected upstream a preheater in which the water was heated to 55-65° C. in increments of 5° C. The pressure prior to the decompression valve was about 3.7 bar, and the pressure in the separation vessel was about 0.22 bar, 0.26 bar and 0.32 bar, respectively, corresponding to a pressure slightly above the vapor pressure at the particular temperature. The oxygen level in the deaerated liquid was monitored as a function of nitrogen addition, ranging from 0-457 Nl/h. The oxygen content prior to deaeration was about 9 ppm, and after deaeration the oxygen content was 0.58 ppm, 0.52 ppm, and 0.65 ppm, respectively.

Example 2

Apple juice (12.7 Brix) was deaerated under the similar conditions as was the case for example 1. At the temperature of 60° C. separation pressure of 0.26 bar, just above the flash pressure, the juice was deaerated from about 9 ppm to below 1 ppm.

Figure 2:
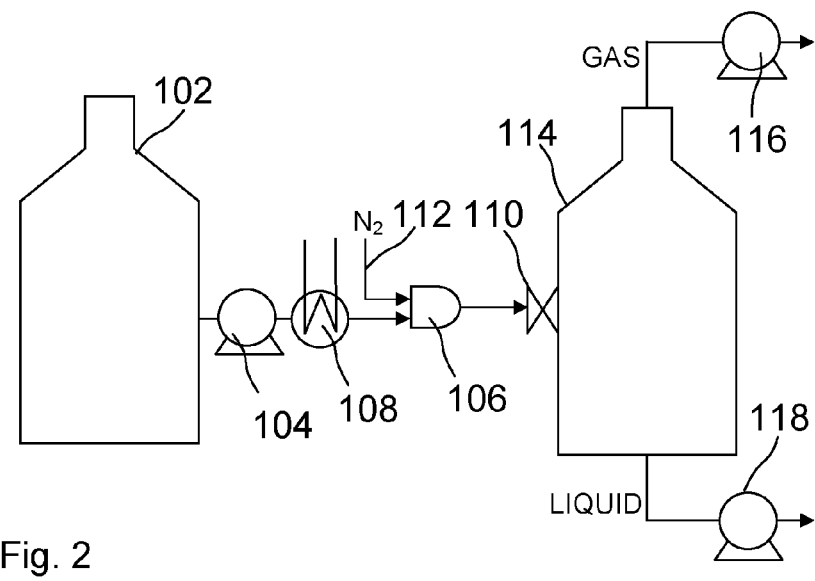
FIG. 2 is a schematic view of a deaerator system according to a second embodiment of the present invention.

In a third example orange juice from concentrate was deaerated under similar conditions as in examples 1 and 2 showing equally beneficial results. In still further set of examples similar validations were conducted as exemplified above, yet the addition of nitrogen was moved to a position downstream the preheater, which is schematically illustrated in FIG. 2. This configuration showed similar results as the previously mentioned set of examples. The numbering used in FIG. 2 is identical to the numbering in FIG. 1, and further description is considered superfluous.

In the examples given the volume ratio of inert gas (nitrogen) to liquid to be deaerated was about 1/9 or less (0-457 Nl/h of nitrogen and 4000 l/h of liquid to be deaerated). As a general rule the deaeration efficiency was improved towards the higher end of the interval, which opens up for even higher ratios. The amount of oxygen remaining in the deaerated product will be the decisive factor for determining the required amount of nitrogen added. Also, both temperature and pressure will affect the solubility of nitrogen in the liquid, and the added amount should and will in most cases exceed the amount predicted by a theoretical amount based on solubility, even if only slightly. Such an approach is then based on the conditions at which the nitrogen is added, i.e. at an elevated pressure. As the liquid passes the decompression valve and the pressure plummets the solubility will drop and nitrogen will be expelled from the liquid, accompanied by oxygen (and other gases for that matter).

In the examples where nitrogen was injected downstream the preheater the residence time of the dissolved nitrogen before depressurization was about 10 s or less. In the examples where the nitrogen was injected upstream the preheater the residence time increased. In terms of deaeration efficiency, however, there was no significant difference between the two.

Figure 3:
FIG. 3 is a schematic flow chart illustrating a method according to a first embodiment of the present invention.

FIG. 3 illustrates a simplified flowchart for a method according to a one embodiment of the present invention.

Referring to FIG. 3 Step 1 corresponds to providing a liquid to be deaerated, the liquid having an elevated pressure; Step 2 corresponds to mixing an inert gas into to liquid to be deaerated; Step 3 corresponds to decompressing the liquid with the now dissolved gas into a separation vessel via a decompression valve; Step 4 corresponds to controlling a pressure inside the separation vessel such that it remains slightly above the flash pressure for the liquid; Step 5 corresponds to pumping the deaerated liquid from the separation vessel for further processing.

A further step of heating the liquid to be deaerated to a well-defined temperature may be included in the inventive method according to one or more embodiments thereof. Unless technically unfeasible the steps of the method may occur in a different order.

The method as such is a continuous method performed on a continuous flow of liquid to be deaerated, as a oppose to methods utilizing various types of holding tanks in which the liquid is kept for a certain period of time in a controlled atmosphere. It may be argued that there is a holding time in connection to the separation vessel as used in the present invention, yet with the possible exception of a start-up sequence before reaching an equilibrium the flow into the separation vessel is balanced by the flow out of the separation vessel. The residence time of the liquid in the separation vessel during steady-state operation is in the order of a few seconds. In this context the residence time is defined as the time the liquid spends within the separation vessel inlet and the outlet thereof.

In the embodiments disclosed herein the capacity of the system has been about 4000 l/h, yet this capacity is only an example. In a commercial application the capacity may vary between about 3000 l/h up to about 50000 l/h, yet for the application of the invention as such the capacity may higher as well as lower than this specified interval.

The liquid referred to in the above mostly relates to liquid intended for foodstuff, and predominantly beverages such as water, juices, lemonade, etc. However, the skilled person realizes that other consumer products may be processed in an inventive system.

Whilst the invention has been described with reference to a preferred embodiment, it will be appreciated that various modifications are possible within the scope of the invention.

In this specification, unless expressly otherwise indicated, the word "or" is used in the sense of an operator that returns a true value when either or both of the stated conditions is met, as opposed to the operator 'exclusive or' which requires that only one of the conditions is met. The word "comprising" is used in the sense of 'including' rather than in to mean 'consisting of'.

The invention claimed is:
1. A method for deaerating a liquid, comprising:
pressurizing the liquid to a pressure above atmospheric,
heating the liquid to a well-defined temperature,
guiding the pressurized liquid to a mixing location,
mixing an inert gas into the pressurized liquid,
guiding the pressurized liquid having inert gas mixed into it to a separation vessel via a decompression valve,
lowering the pressure in the separation vessel to a pressure above the vapor pressure for the liquid, at the well-defined temperature,
evacuating the released gases from the separation vessel, and
pumping the thus deaerated liquid from the separation vessel for further processing.

2. The method of claim 1, wherein the pressure in the separation vessel is maintained within an interval of about 0-0.1 bar above the vapor pressure.

3. The method of claim 1, wherein the well-defined temperature is a temperature within the interval of about 50-70° C.

4. The method of claim 1, wherein the volume ratio of inert gas to liquid to be deaerated is about ⅛ or less.

5. The method of claim 1, wherein the inert gas is nitrogen.

6. The method of claim 1, wherein the method is a continuous method performed on a continuous flow of liquid to be deaerated.

\* \* \* \* \*